ELECTRICAL NETWORK ASSEMBLIES

Filed March 18, 1960

3 Sheets-Sheet 1

INVENTORS.
JOHN PARSTORFER
EDGAR O. SPRUDE

BY Samuel Kane
ATTORNEY

ELECTRICAL NETWORK ASSEMBLIES

Filed March 18, 1960 3 Sheets-Sheet 2

INVENTORS.
JOHN PARSTORFER
EDGAR O. SPRUDE

BY Samuel Kane

ATTORNEY

ELECTRICAL NETWORK ASSEMBLIES

Filed March 18, 1960 3 Sheets-Sheet 3

INVENTORS.
JOHN PARSTORFER
EDGAR O. SPRUDE

BY Samuel Kane
ATTORNEY

United States Patent Office 3,227,926 Patented Jan. 4, 1966

3,227,926
ELECTRICAL NETWORK ASSEMBLIES

John Parstorfer and Edgar O. Sprude, Philadelphia, Pa., assignors to Burroughs Corporation, Detroit, Mich., a corporation of Michigan Filed Mar. 18, 1960, Ser. No. 15,920
9 Claims. (Cl. 317—101)

This invention relates generally to electrical and electronic apparatus and more particularly to network assemblies of such apparatus including receptacle structures and plug-in modules. While the invention is not limited thereto, it finds special utility in the fabrication of electronic computers.

In the development of electronic apparatus, particularly in the computer field, considerable effort has been devoted to the development of high density packaging and miniaturization techniques whereby the size of computers and similar equipment may be reduced. These objectives are difficult to attain because of the complexities involved in making reliable circuit connections and the difficulties encountered in maintenance and servicing of individual components.

An important object of the present invention is to tion to accommodate a preselected number of electrical components and overcoming the above-mentioned complexities and difficulties.

Another important object of the invention is to provide an electrical structure in which a large variety of circuit connections may be readily made in a rapid and simple manner.

A further important object of the invention is to provide an electrical assembly which is easy to service and maintain.

Still another important object of the invention is to provide an electrical receptacle structure of modular design adapted for plug-in connection with one or more novel electrical modules each of which may carry a number of electrical components.

A still further important object of the invention is to provide a variable electrical structure of modular design which may readily be adapted for plug-in connection to accommodate a preselected number of electrical modules of different sizes and of substantially standard external configuration.

Another important object of the invention is to provide such a structure in which all of its parts may be standardized and manufactured by mass production techniques.

In accordance with the above objects and considered first in its broad aspects, the invention comprises a novel receptacle structure divided into compartments into which plug-in modules containing electrical components are received. Each module is formed with a prefabricated component carrier so constructed as to enable each component to be serviced or removed from the module without disturbing other components or the structure of the module as a whole. Alternatively, if the serviceable feature of the modules is not desired, the modules may readily be encapsulated to provide greater ruggedness and resistance to shock and humidity.

The invention will be more clearly understood when the following detailed description of a specific embodiment thereof is read in conjunction with the accompanying drawings in which.

Figures 5, 6, 7, 8, 9, 9A:
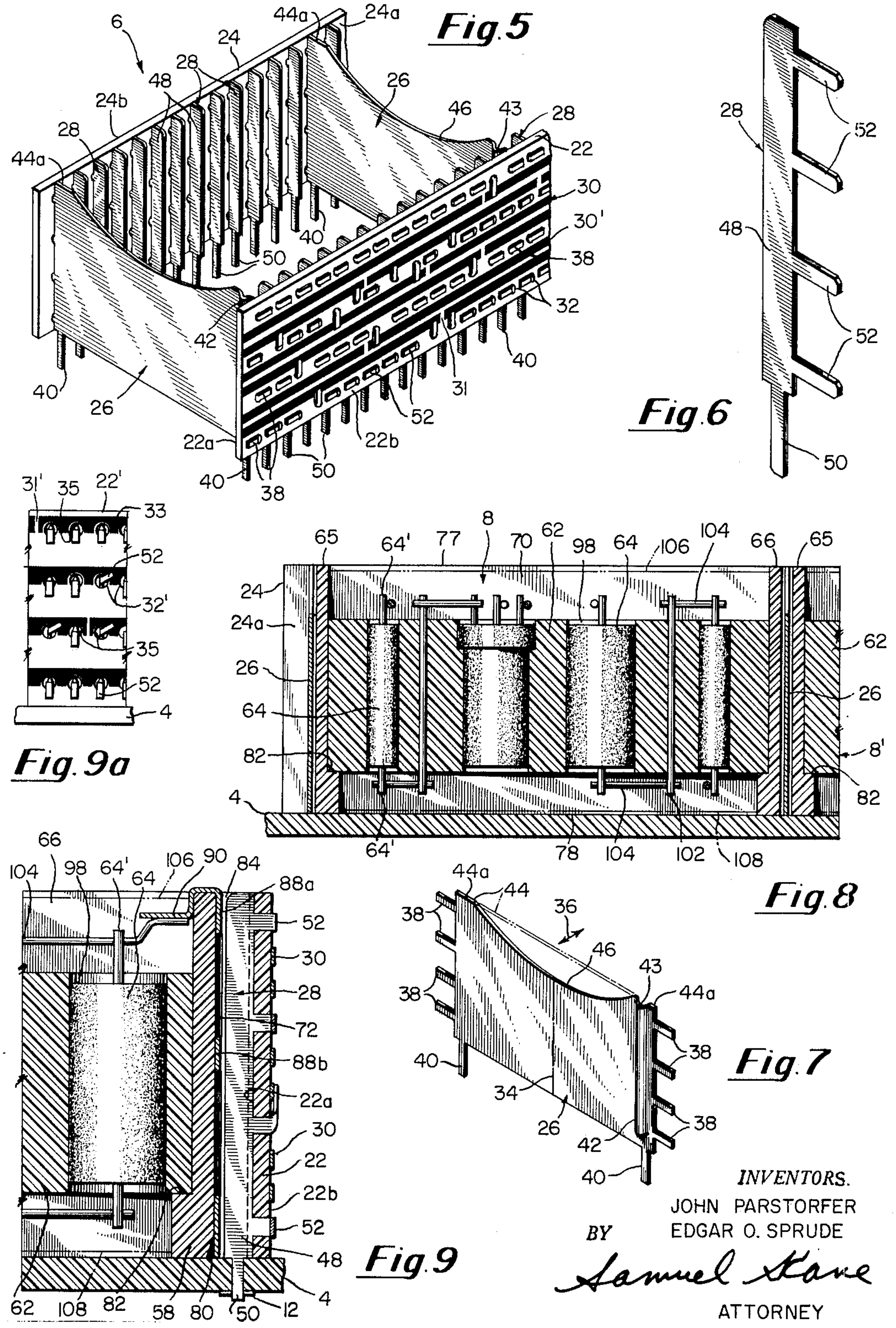
FIG. 5 is a fragmentary enlarged isometric view of the electrical modular frame or receptacle and showing portions of a pair of the contact panels.
FIG. 6 is an enlarged isometric view of one of a number of similar knife contacts showing the contact before it is assembled to the receptacle frame.
FIG. 7 is an isometric view of one of a number of similar barriers or divider members showing the divider member before it is assembled to the receptacle frame.
FIG. 8 is a vertical sectional view taken along line 8—8 of FIG. 2 showing certain parts of the electrical module and omitting the encapsulating material.
FIG. 9 is a vertical section view taken along line 9—9 of FIG. 2 also omitting the encapsulating material.
Figure 11:
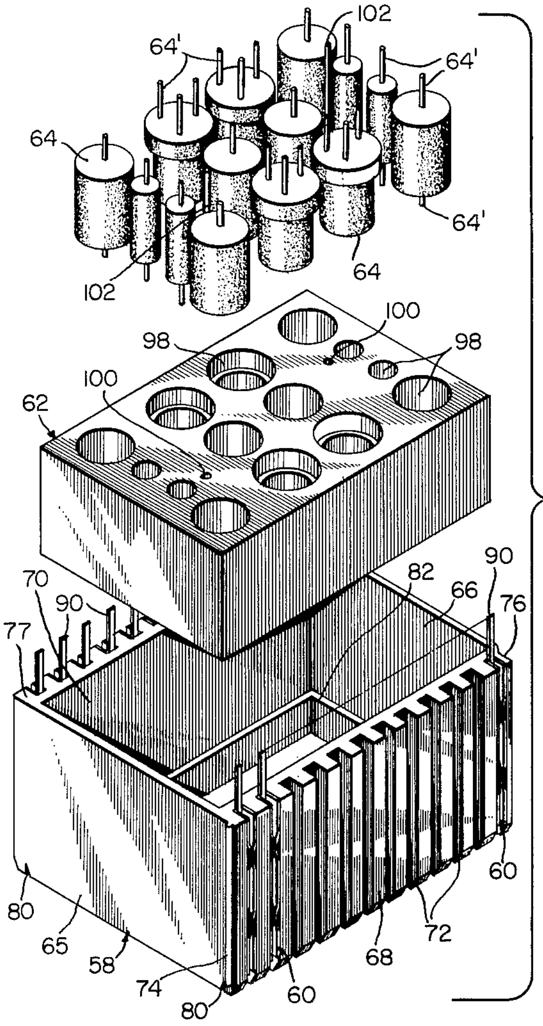
Figure 12:
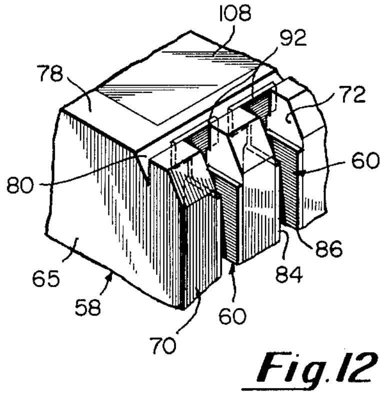
Figure 13:
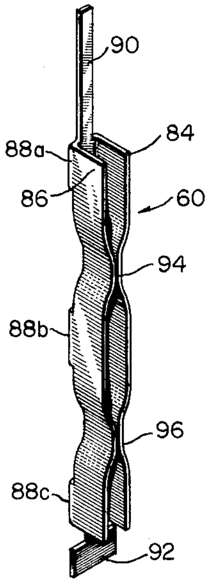
Figure 10:
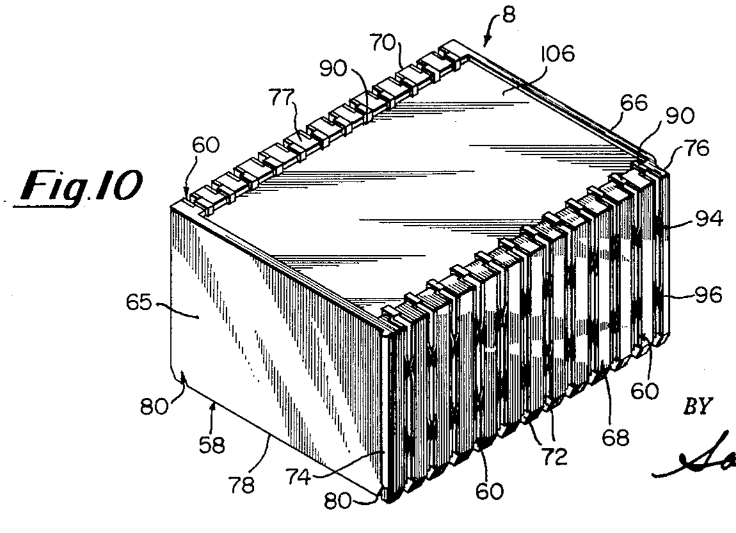

FIG. 9*a* illustrates a modification of the contact panels;

FIG. 10 is an isometric view of one of the electrical modules in the encapsulated form;

FIG. 11 is an exploded or separated view of the electrical module of FIG. 10 with the encapsulating material omitted;

FIG. 12 is an enlarged bottom view of one of the corner regions of the electrical module; and FIG. 13 is an enlarged isometric view of one of a number of similar spring contacts showing the spring contact before it is assembled to the electrical module.

Figure 1:
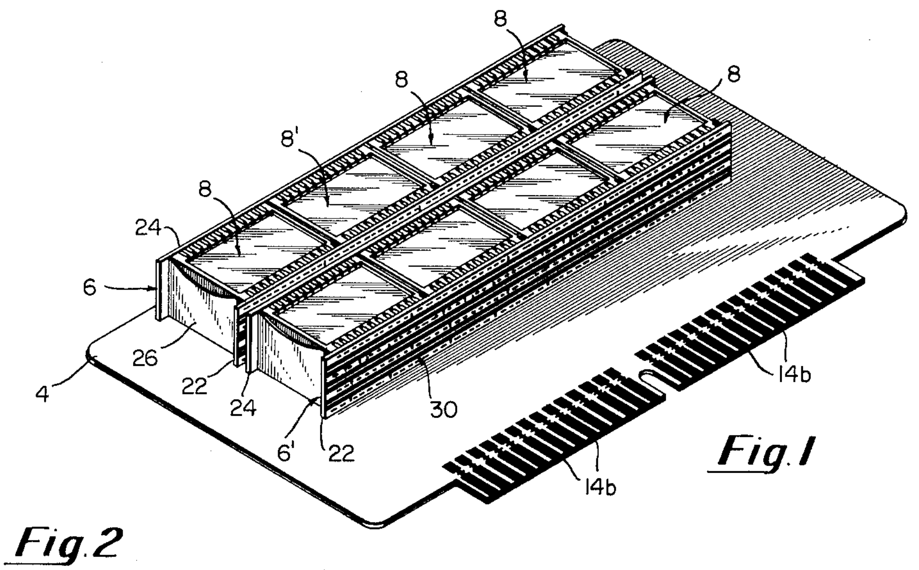
FIG. 1 is an isometric view of an electrical assembly constructed in accordance with the invention.

Turning now to the drawings, the electrical assembly shown in FIG. 1 includes a base or supporting panel, which may be a printed circuit board 4, as shown, and one or more modular receptacle frames 6 and 6' which are adaptable for plug-in reception of one or more electrical modules 8.

The printed circuit board 4 has a plurality of conductors 12 and 12' on its bottom surface (FIG. 4) arranged in accordance with a predetermined circuit pattern. Conductors 12 terminate at one end on a row of parallel marginal conductors 14*a* which may be electrically connected to a corresponding row of marginal conductors 14*b* (FIG. 1) on the top surface of the printed circuit board 4 by any suitable means such as jumper wires, not shown, extending through apertures 16 in the board 4 and connected to the corresponding ones of the marginal conductors 14*a* and 14*b*. By means of the marginal conductors 14*a* and 14*b* the printed circuit board 4 is adapted for plug-in connection into associated electrical apparatus, not shown, in accordance with well known practice. The conductors 12' are normally shorter and serve for making internal connections, as will be explained more clearly hereinafter.

Figure 4:
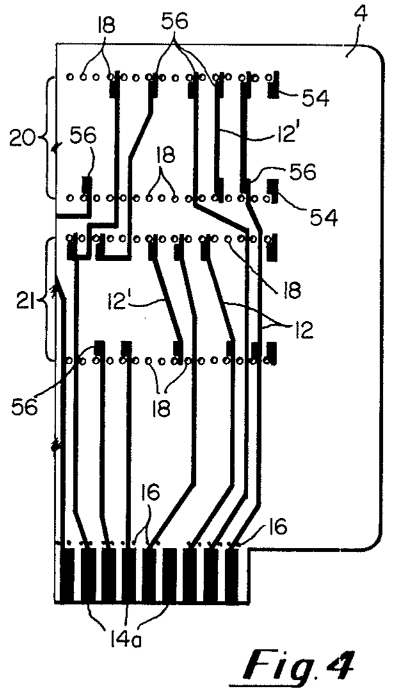
FIG. 4 is an enlarged bottom view of part of the assembly of FIG. 1, with certain elements omitted for purposes of clarity.

As shown in FIG. 4, the printed circuit board 4 is provided, in this embodiment, with four parallel rows of holes 18, with the holes extending through the board 4 and being equally spaced apart in each row. The rows of holes 18 are grouped into pairs of rows 20 and 21, one pair being provided for each receptacle frame, the pair 20 being associated with the receptacle frame 6 and the pair 21 being associated with the receptacle frame 6'.

The receptacle frames 6 and 6' are similarly constructed, so a description of only one will suffice. It is understood that the showing of two receptacle frames in the assembly of FIG. 1 is illustrative only, since any number of frames and associated rows of holes 18 may be used depending upon the particular circuit application.

The receptacle frame 6, for example, includes a pair of elongated parallel extending contact panels 22 and 24 (FIG. 5) and two or more cross barrier plates or dividers 26. The inside or confronting faces 22*a* and 24a of the two contact panels 22 and 24 respectively are provided with a plurality of spaced apart knife contacts 28.

Figure 2:
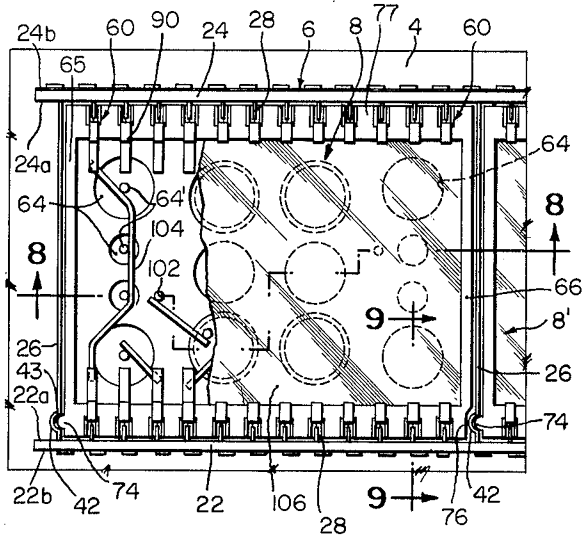
FIG. 2 is an enlarged plan view of a fragmentary portion of FIG. 1 showing one of the electrical modules, and with a portion of an encapsulating material broken away to more clearly reveal other parts.

Each of the contact panels 22 and 24 is similarly constructed of an elongated rectangular panel of electrically insulating material having a plurality of elongated parallel printed circuit conductors 30 (shown in solid black in FIG. 3) on their external faces 22b and 24b respectively (FIGS. 2 and 5). The contact panels 22 and 24 are also similarly provided with a rectangular array of through holes 32 arranged in horizontal and vertical rows, as seen most clearly in FIG. 3, with certain of the horizontal rows of holes 32 disposed between pairs of conductors 30. The horizontal spacing of the holes 32 in each row is the same as the spacing between holes 18 in either of the associated rows of holes 18 of the pair of rows 20 (FIG. 4). Conductors 30 may be severed at one or more places, according to the particular circuit requirements, to provide discontinuities 31 and divide the conductors 30 into two or more segments 30′.

For purposes of economy and ease of assembly, the barrier plates or dividers 26 (FIGS. 5 and 7) are preferably of one-piece construction of thin, flexible sheet material such, for example, as brass. Because of their thinness, assembly of the dividers 26 in the receptacle frame 6, as will be explained more fully hereinafter, may result in their being somewhat bent or bowed at their generally medial portions, indicated by broken line 34, in the directions of arrows 36. However, this condition will be corrected when the electrical module 8 is inserted into the receptacle frame 6, as will be explained hereinafter.

As is evident in FIG. 7, each divider 26 is formed with lateral tabs 38 and depending tabs 40. Along one of the groups of tabs 38 is an elongated orienting ridge or offset 42 extending downwardly from the top edge 44 of the divider 26 and forming a concave recess 43 along the opposite face of the divider. The top edge 44 is provided with an indentation 46 at its medial portion which extends downwardly from the top corner regions 44a of the top edge 44.

A divider 26 is provided at each end of the receptacle frame 6 to establish and maintain the contact panels 22 and 24 in spaced relation. An additional number of dividers 26 is utilized between the contact panels to further support the panels in spaced relation and to divide the receptacle frame into the required number of modular compartments. As will be apparent more clearly hereinafter, the compartments may be varied in size merely by suitably positioning the dividers 26 in the receptacle frame for accommodating modules 8 of different lengths.

The knife contacts 28, one of which is shown in FIG. 6, are formed of an electrically conductive material and each comprises an elongated blade 48 having a depending tab 50 and lateral tabs 52 which extend from one side of the blade.

In the assembled condition of the receptacle frame 6 (FIG. 5), the knife contacts 28 are mounted on the confronting faces 22a and 24a of the contact panels 22 and 24 with the blades 48 perpendicular to these faces and the lateral tabs 52 of each knife contact extending through a vertical row of holes 32 (FIG. 3) of its associated contact panel. Appropriate ones of the tabs 52 are then twisted and bent upwardly or downwardly to make electrical contact with one or the other of the adjacent conductors 30, according to the particular circuit requirements. Those tabs 52 which are not to contact a conductor 30 are simply bent to the right or to the left against the insulating portion of the contact panel. Thus it will be seen that a particular knife contact 28 may be electrically connected to one or more of the conductors 30 simply by bending up or down appropriate ones of its lateral tabs 52.

Figure 3:
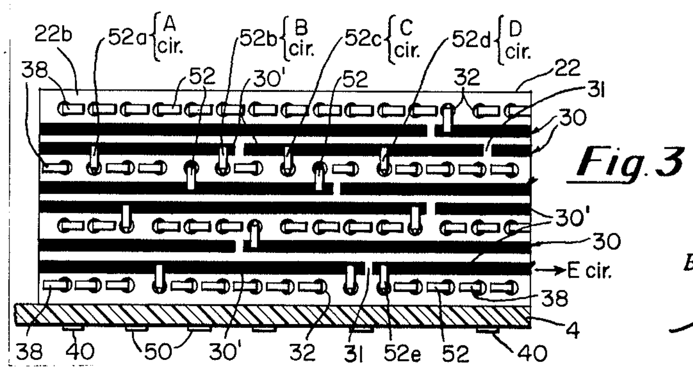
FIG. 3 is an elevational view of the structure in FIG. 2 and showing one of a pair of contact panels.

The dividers 26 are secured to the contact panels 22 and 24 in a similar manner by inserting tabs 38 through a vertical row of holes 32 in each contact panel and bending their ends over against the insulating portion of the panels, preferably in alternately opposite directions as seen in FIG. 3, to provide greater stability of the receptacle frame 6 structure.

The receptacle frame 6 is mounted on the top surface of the printed circuit board 4 (FIG. 1) with the tabs 40 and 50 projecting through the holes 18 in the pair of rows 20. As shown in FIG. 4, the projecting tabs 40 and 50 have been omitted for purposes of clarity. The projecting tabs 40 are bent over against the insulating portion of the circuit board 4, or they may be soldered to the circuit board, if desired. For soldering purposes, there are provided isolated pads 54, preferably of the same metallic material as the conductors 12 and 12′, in which case the tabs 40 are soldered to the pads 54. The projecting tabs 50 are similarly bent over against the bottom of the circuit board 4 into electrical contact with pads 56 which form parts of conductors 12 and 12′ and then bonded to the pads 56, as by soldering.

In certain applications, depending on the circuit, the tab 50 of a particular knife contact 28 may not be utilized. In such cases, the knife contact 28 will not be in direct electrical contact with a conductor 12 or 12′ but will be in the circuit of such conductor, as will readily be understood, through the medium of one of its lateral tabs 52, a conductor segment 30′ and the depending tab 50 of a different knife contact 28 which also is in circuit with the same segment 30′. The tabs 50 which are not being utilized may be bent over against the bottom of circuit board 4 against the insulating portion or snipped off flush with the bottom of the board, if desired.

The electrical modules 8 (FIGS. 1 and 10) each comprises a contact frame 58 (FIG. 11) of electrical insulating material having external electrical spring contacts 60 along its opposite sides, a component carrier 62, and a plurality of electrical components 64 such as resistors, diodes, capacitors, transistors, etc.

The contact frame 58, as seen more clearly in FIG. 11, is of open rectangular construction and has left and right end wall members 65 and 66 and front and rear side wall members 68 and 70. The external faces of the side walls 68 and 70 are formed with spaced rectangular slots 72 extending from top to bottom and in which are received the spring contacts 60 (FIG. 13). On the end wall 65 adjacent to side wall 68 is an elongated orienting ride 74, while in the end wall 66 adjacent to side wall 68 is an elongated step or recess 76. The bottom 78 of the contact frame 58 is formed with two notches 80, one of which is shown more clearly in FIG. 12, and each adjacent to one of the side walls 68 and 70. Inside the contact frame 58, and formed as an integral part of the walls 65, 66, 68 and 70 is a stop shoulder 82 for positioning the component carrier 62 in the contact frame.

The spring contacts 60, one of which is shown in FIG. 13, have a channel-like formation comprising lateral flanges 84 and 86 extending from spaced central rib portions 88a, 88b and 88c. A terminal tab 90 and an anchoring lug 92 extend from the central rib portions 88a and 88c respectively. Between the ribs the flanges 84 and 86 are dimpled, as at 94 and 96, to bring their confronting faces close together or into contact with each other.

The component carrier 62 (FIG. 11) is preferably a preformed block of insulating plastic material and exhibiting a honeycomb configuration. The carrier 62 is provided with a plurality of openings or recesses 98, each adapted for snugly receiving an electrical component 64. The component carrier 62 may also be provided with one or more smaller openings 100, each adapted to snugly receive an interconnecting wire 102.

The spring contacts 60 are placed into slots 72 and the anchor lugs 92 positioned in notches 80. Components 64 and interconnecting wires 102 are assembled into the component carrier 62 and this assembly slidingly inserted into the contact frame 58 and positioned against the stop shoulder 82 (FIG. 8). If desired, the component carrier 62 may be cemented or otherwise secured to the contact frame 58. The component leads 64' are electrically connected, according to the particular circuit, by means of jumper wires 104 and the interconnecting wires 102, as by soldering, or other suitable manner. Terminal tabs 90 (FIGS. 9 and 11) are then bent inwardly and soldered or otherwise bonded to the upper jumper wires 104.

The electrical modules 8 may be left in the condition shown in FIG. 8, that is, with the leads 64' and the interconnecting wires 102 and jumper wires 104 exposed to provide an accessible, serviceable unit. Thus each component 64 may be serviced or replaced independently of the other components. On the other hand, if desired, the electrical modules 8 may be filled with layers of an encapsulating material, indicated by broken lines 106 and 108 in FIG. 8, substantially flush with the top and bottom surfaces 77 and 78 of the modules 8 thus to provide more rugged expendable sealed units.

The electrical modules 8 are plugged into the receptacle frame 6 with the spring contacts 60 straddling the knife contacts 28 and the dimpled regions 94 and 96 exerting a spring contact force on the blades 48. It will now be clear that the electrical components 64 will be in circuit with the board conductors 12.

When a module 8 is first inserted into the receptacle frame 6 (FIG. 5) its lower corner regions will first pass between the upper corners 44*a* of the dividers 26. The corners 44*a* being adjacent to the contact panels 22 and 24 will be substantially rigid and therefore properly positioned relative to the contact panels. However, as mentioned earlier, the medial portions 34 (FIG. 7) of the dividers 26 might be slightly bent in one direction or the other, as indicated by arrows 36, so that if the top edge 44 were straight, as indicated by the broken line, one or both of the top edges of the adjacent dividers 26 might offer interference to the insertion of the module 8. By providing the dividers with the indentation 46 in their top edges, the end walls 65 and 66 of module 8 will cam out any bend in the dividers as the module is pushed further into the receptacle frame 6. In this connection, it is understood that the contact panels will "give" a certain amount to allow the dividers to be cammed out flat when the module is inserted into the receptacle frame.

When plugging the module 8 into the receptacle frame 6, it is first oriented by aligning its ridge 74 with the recess 43 of one divider 26 and its recess 76 with the offset 42 of the adjacent divider. Correct insertion of the module 8 into the receptacle frame 6 is therefore assured.

Returning again to FIG. 3, it will be seen that by dividing each conductor 30 into segments 30', each conductor serves for making connections between different circuits. For example, assume that the components 64 in the module 8 (FIG. 2) are divided into first, second, third and fourth circuits, A, B, C and D, and that a fifth circuit E comprises certain components 64 in the adjacent module 8'. The output of A circuit may be a tab 52*a* (FIG. 3) connected to the input tab 52*b* of D circuit by means of a segment 30'. The output of C circuit may be a tab 52*c* similarly connected by means of a segment 30' to the input tab 52*d* of D circuit. By means of a tab 52*e* on the same knife contact 28 containing the tab 52*d*, and a segment 31', C circuit may also be connected to E circuit in the adjacent module 8'.

A modification of the contact panels is illustrated in FIG. 9*a* in which the through holes 2' substantially intersect the conductors 33. As shown in that figure, arcuate portions of the conductors 33 are removed, as at 35, and the holes 32' located within the arcuate regions 35. In this modification, the tabs 52 are each adapted for contacting one conductor 33 only, however, it will be apparent that other arrangements may readily be devised.

It will now be seen that the invention provides a compact electrical network assembly of unique design, characterized by its extreme simplicity and flexibility for making complex circuit connections for a wide variety of circuits and by its variability for accommodating electrical modules of different lengths. The construction of the electrical modules is such as to provide a choice of nonserviceable, expendable units, or those that are readily serviced.

While there has been disclosed a specific structure exemplary of the principles of the invention, it will readily be understood that the invention may be constructed in a variety of shapes, sizes and modifications without departing from the true spirit and scope thereof. Accordingly, it is to be understood that the invention is not to be limited by the specific embodiment disclosed, but only by the subjoined claims.

What is claimed is:

1. An electrical assembly comprising a supporting member, a pair of relatively thin rectangular panels of nonconductive material edge-mounted on said supporting member in spaced parallel relation, spaced elongated electrical conductors on the outside faces of said panels extending parallel to said supporting member, said panels having perforations passing through the nonconductive material at points located between adjacent conductors, and spaced elongated electrical contacts on the confronting faces of said panels extending normal to said electrical conductors, each contact having tabs extending through certain of said perforations and projecting beyond the outer face of its associated panel, the projecting ends of certain of said tabs being bent over into electrical connection with one of the adjacent conductors.

2. An electrical assembly comprising a circuit board having a plurality of conductors on at least one side, a pair of elongated rectangular panels of nonconductive material vertically mounted on said circuit board in spaced parallel confronting relation, spaced parallel conductors on the outside faces of said panels extending along the longitudinal dimension thereof, said panels having perforations therethrough opening between adjacent ones of said parallel conductors, elongated contacts on the confronting faces of said panels extending normally to said parallel conductors, each of said elongated contacts having tabs extending through certain of said perforations with at least one tab thereof being selectively electrically connected to either one of its adjacent parallel conductors, each of said elongated contacts having an additional tab electrically connected to one of said circuit board conductors, and selectively positionable divider members securing said panels in said spaced relation and defining therewith modular compartments selected in size by the positioning of said divider members and each containing a number of said elongated contacts.

3. An electrical assembly comprising a circuit board having a plurality of conductors on at least one side, a pair of rectangular panels of nonconductive material vertically mounted on said circuit board in spaced parallel confronting relation, spaced parallel conductors on the outside faces of said panels, certain of said parallel conductors having a discontinuity therein forming segment conductors, said panels having perforations therethrough opening between adjacent ones of said parallel conductors, elongated knife contacts on the confronting faces of said panels extending normal to said parallel conductors, each of said knife contacts having lateral extending tabs projecting through certain of said perforations with certain of said tabs being bent over into electrical contact with a selected one of their adjacent parallel conductors, each of said knife contacts having a depending tab electrically connected to one of said circuit board conductors, vertically positioned divider members extending between said panels for securing said panels in said spaced relation and forming the boundaries of modular compartments each containing a number of said knife contacts, and plug-in type electrical modules each inserted into one of said compartments and having spring contacts mating with the knife contacts in said compartment.

4. An electrical module comprising an open rectangular frame having vertical side and end wall members, spaced parallel elongated contacts on the outside faces of said side wall members, a stop shoulder inside said frame adjacent to the bottom thereof, a carrier block inside said frame resting on said stop shoulder and defining an open recess within the bottom of said frame, and a plurality of electrical components mounted in said carrier block, each of said electrical components having an electrical lead disposed in said recess and being electrically connected to one of said contacts.

5. An electrical module comprising an open vertical rectangular frame having side and end wall members, spaced parallel spring contacts on the outside faces of said side wall members extending between the top and bottom of said frame, a stop shoulder inside said frame adjacent to the bottom thereof, a carrier block slidably fitted into said frame and resting on said stop shoulder, said carrier block defining open recesses within the top and bottom of said frame, a plurality of electrical components each having leads and being mounted in said carrier block, certain of said leads being disposed in one of said recesses for electrical connection one with another and certain of said leads being disposed in the other of said recesses and being electrically connected to said spring contacts, and electrical insulating material filling in said recesses substantially flush with the top and bottom of said frame and encapsulating said leads.

6. An electrical panel assembly comprising, a vertical rectangular panel of electrically insulating material having a plurality of perforations extending therethrough, said perforations being arranged in vertical and horizontal rows, a plurality of conductors on one face of said panel extending parallel to said horizontal rows, said conductors being arranged in pairs with each pair spaced from an adjacent pair and disposed between adjacent horizontal rows of perforations, a plurality of elongated contact elements on the opposite face of said panel normal to said conductors and each associated with one of said vertical rows, and electrically conductive means extending through the perforations in each vertical row for selectively electrically connecting the contact element associated with that row to either conductor adjacent to said perforation or for mechanically non-electrically connecting said contact element directly to said panel.

7. An electrical assembly comprising a support member, a pair of relatively thin panels of nonconductive material edge-mounted on said support member in spaced parallel relation, a plurality of elongated electrical conductors extending along the outer faces of said panels in generally parallel spaced relation to one another, a series of spaced electrical contacts extending along the confronting faces of said panels in generally parallel relation to one another and perpendicular to the conductors on the outer faces, a plurality of plate-like bridging members adjustably secured to said panels in a spaced array for forming a plurality of compartments which are adjustable in size in accordance with the spacing between adjacent bridging members, a plurality of electrical plug-in modules each inserted into one of said compartments and having contacts along their side surfaces mating with the electrical contacts on the confronting faces of the panels, and means for selectively programming the electrical connections between the contacts on said modules and the conductors on the outer faces of the panels, said means including a plurality of conductive members extending from each of the contacts on the confronting panel faces, such conductive members extending through apertures in the panels which are insulatingly spaced from the conductors on the outer faces of the panels, selective ones of said conductive members being positioned in electrical contact with said conductors.

8. An electrical assembly as defined in claim 7 wherein the conductive members of the programming means comprise conductive tabs extending from the contacts on the confronting faces of the panels, selective ones of said tabs being bent over into contact with the conductors on the outer faces of the panels while the remaining tabs are bent over into contact with the insulating surfaces of the panels.

9. An electrical assembly as defined in claim 7 wherein the electrical contact members and the plate-like bridging members have similar arrangements of lateral depending tabs to facilitate the interchangeability and adjustable positioning of said members on said support member and on said thin panels of nonconductive material.

References Cited by the Examiner

UNITED STATES PATENTS

| | | | |
|---|---|---|---|
| 2,816,253 | 12/1957 | Blitz | 317—101 |
| 2,870,400 | 1/1959 | Hickok | 317—101 |
| 2,907,926 | 10/1959 | Slack | 317—101 |
| 2,910,628 | 10/1959 | Keener | 317—101 |
| 2,994,806 | 7/1961 | McLaughlin | 317—101 |

FOREIGN PATENTS

| | | |
|---|---|---|
| 714,125 | 11/1931 | France. |

KATHLEEN H. CLAFFY, *Primary Examiner.*

LLOYD McCOLLUM, E. JAMES SAX, JOHN F. BURNS, *Examiners.*